(12) United States Patent
Nettleton

(10) Patent No.: US 7,248,608 B2
(45) Date of Patent: Jul. 24, 2007

(54) MONOBLOCK LASER

(75) Inventor: John E. Nettleton, Fairfax Station, VA (US)

(73) Assignee: United States of America as represented by the Department of the Army, Washington, DC (US)

( * ) Notice: Subject to any disclaimer, the term of this patent is extended or adjusted under 35 U.S.C. 154(b) by 225 days.

(21) Appl. No.: 10/974,798

(22) Filed: Oct. 28, 2004

(65) Prior Publication Data

US 2006/0092991 A1    May 4, 2006

(51) Int. Cl.
*H01S 3/11* (2006.01)
(52) U.S. Cl. .......................... 372/10; 372/21; 372/50.1
(58) Field of Classification Search ................ 372/10, 372/21, 50.1
See application file for complete search history.

(56) References Cited

U.S. PATENT DOCUMENTS

| | | | |
|---|---|---|---|
| 5,365,366 A * | 11/1994 | Kafka et al. | 359/330 |
| 6,373,865 B1 * | 4/2002 | Nettleton et al. | 372/10 |
| 6,556,614 B2 * | 4/2003 | Nettleton et al. | 372/107 |
| 2004/0218652 A1 * | 11/2004 | Spariosu et al. | 372/70 |
| 2006/0092992 A1 * | 5/2006 | Nettleton | 372/10 |
| 2006/0171429 A1 * | 8/2006 | Seitel | 372/10 |
| 2006/0259021 A1 * | 11/2006 | Lin | 606/4 |

* cited by examiner

*Primary Examiner*—Minsun Oh Harvey
*Assistant Examiner*—Delma R. Flores Ruiz
(74) *Attorney, Agent, or Firm*—Andrew Romero

(57) ABSTRACT

An improved monoblock laser cavity is made by elongating the Optical parametric oscillation (OPO) cavity. This can be accomplished by changing the coatings on the OPO material and Q-switch and by elongating the OPO cavity to approximately 2 to 3 times the OPO crystal length. The increase in the length of the OPO cavity will improve the beam divergence of the laser.

6 Claims, 1 Drawing Sheet

MONOBLOCK LASER

GOVERNMENT INTEREST

The invention described herein may be manufactured, used, sold, imported, and/or licensed by or for the Government of the United States of America.

FIELD OF THE INVENTION

The present invention generally relates to optically pumped, solid-state, Q-switched and linearly polarized laser cavity assemblies and, more specifically, to an improved monoblock laser and the method of making the laser.

BACKGROUND OF THE INVENTION

The present invention is an improvement to the monoblock laser described and claimed in U.S. Pat. No. 6,556,614, entitled, Monolithic Solid State LASER Assembly and Method of Manufacture, issued Apr. 29, 2003. This patent is incorporated herein by reference with only the necessary parts being duplicated in this specification.

The invention described in U.S. Pat. No. 6,556,614, is a photon pumped laser cavity assembly consisting of a pair of coaxial rods made from laser gain material with precisely cut side-faces and end-faces. Some of the end-faces are covered by at least one of a dielectric or metal coating highly reflective to the laser output beam, a wafer of polarizing material, and a dielectric or metal coating partially reflective to the laser beam. More details of this prior art will be described in the Detailed Description of the Invention Laser range finders are becoming an increasingly vital component in high precision targeting engagements. The precise and accurate range to target information is an essential variable to the fire control equation of most weapon systems. Unfortunately, current fielded laser range finders are bulky, heavy and expensive. These laser range finders were not developed with the idea that would be carried by forces.

The monoblock laser described in the U.S. Pat. No. 6,556,614 makes the development/fabrication of a very low cost, compact laser range finder feasible. Unfortunately, the beam divergence of the monoblock laser is rather larger (>8 mRad)(low brightness laser) which means a sizable optic is required to collimate the monoblock laser output.

Accordingly, there is in a need in the prior to make monoblock lasers brighter by decreasing the beam divergence of the laser. The present invention addresses this need.

SUMMARY OF THE INVENTION

One object of the present invention is to make monoblock lasers brighter by decreasing the beam divergence of the laser. This is achieved by elongating the Optical parametric oscillation (OPO) cavity. This can be accomplished by changing the coatings on the OPO material and q-switch, as depicted in FIG. 1 and by elongating the OPO cavity to approximately 2 to 3 times the OPO crystal length. The increase in the length of the OPO cavity will improve the beam divergence of the laser.

BRIEF DESCRIPTION OF THE DRAWINGS

The foregoing and other objects, aspects and advantages will be better understood from the following detailed description of the invention with reference to the drawings, in which.

DETAILED DESCRIPTION OF THE INVENTION

Figure 1:
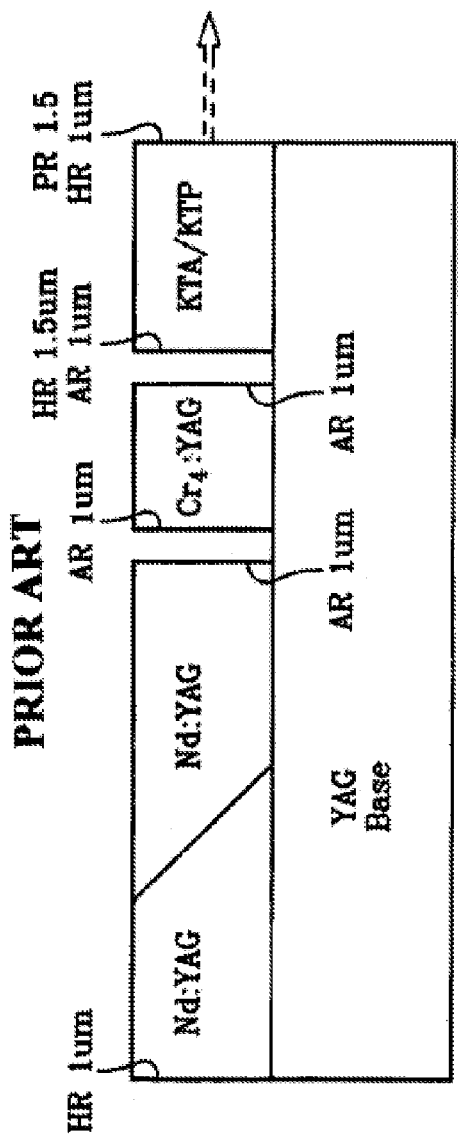
FIG. 1 shows a monoblock laser according to the prior art.

As shown in FIG. 1, the prior art monoblock laser compromises a block of laser gain material such as Neodymium:Yttrium-Aluminum-Garnet (Nd:YAG) and a high reflector having a wavelength about 1 um disposed on one side and an antireflector having a wavelength of 1 um disposed on an opposite end. Optically coupled to the laser gain material is a Q-switch made of a material such as Cr4+:YAG. The Q-switch is coupled to the laser gain material with an antireflector coating matching (1 um) the antireflector coated on the laser gain material. The Q-switch at the opposite end has another an antireflector coating of 1 um disposed at an output end of the Q-switch. Then, the Q-switch is optically coupled to the OPO cavity which has, in order, a high reflector coating of 1.5 um, an antireflector coating of 1 um on an input end and then, at the output end, a partial reflector coating of 1.5 and a high reflector coating of 1 um. The OPO cavity may be made of such materials as $KTiOPO_4$ (KTP)/$KTiOAsO_4$ (KTA).

The improvement of the present invention is made by elongating the OPO cavity. For example, this can be accomplished by changing the coatings on the OPO material and Q-switch, as shown by comparing FIGS. 1 and 2, and by elongating the OPO cavity (shown in FIG. 2) to approximately 2 to 3 times the OPO crystal length. The lengthening of the OPO cavity, therefore, improves the beam divergence of the laser.

Figure 2:
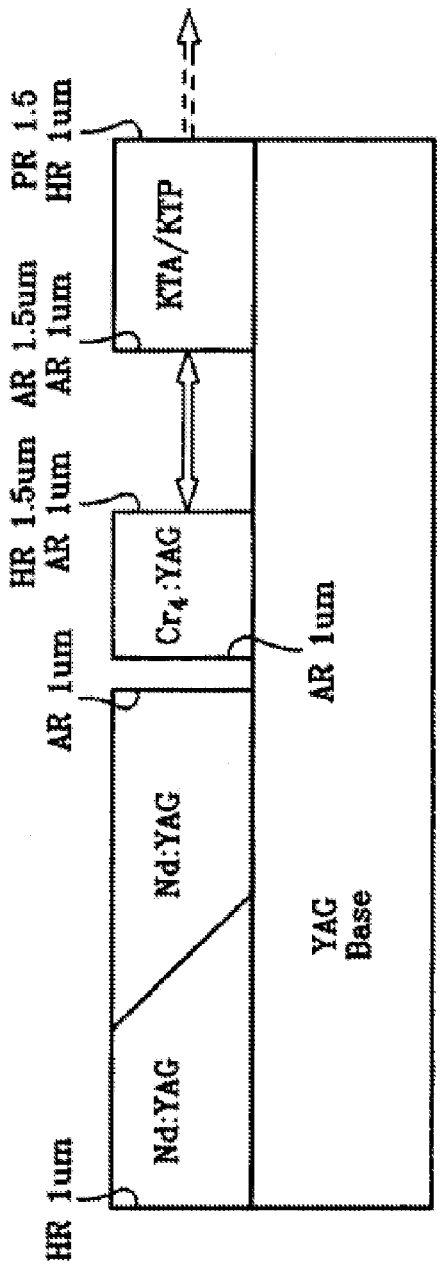
FIG. 2 shows an elongated monoblock laser according to the present invention.

As shown in FIG. 2, the coatings of the Q-switch are changed from an AR coating of 1 um on both sides to AR outer coatings of 1 um and an additional inner coating of HR of 1.5 um. The HR coating of 1 um of the input to the OPO cavity is changed to an AR coating of 1.5 um.

As those skilled in the art will recognize, this improved beam divergence improves the brightness of the monoblock laser. The tighter beam divergence (improved brightness) of the improved monoblock laser allows for the use of a smaller diameter optic to collimate the laser output for use in a laser range finder.

This improved monoblock laser cavity is still a simple module that requires none of the labor extensive alignment procedures as current laser range finder solid state sources. No optical holders have to be fabricated, no complex engineering is required to design the optical cavity, and no precise laser cavity alignment(s) are required. Therefore, production labor and material costs are greatly reduced.

Moreover, the improved monoblock laser cavity of the present invention is a modular component. The modularity lends to ease of design for different pump sources. It can be incorporated in a flash lamp pumped or laser diode pumped system.

The present invention may be used as the laser source in very compact laser range finders that require more than 2 kilometers range performance. It generates eye safe laser output for eye safe laser range finding. These laser range finders have both military and commercial applications. The compact design of the improved monoblock laser cavity also lends itself to placement in other laser based portable/handheld devices. These may be medical devices, industrial tools or scientific equipment that would benefit from the size/weight reduction, dependable performance, and low cost.

While this invention has been described in terms of preferred embodiment consisting of a one piece assembly made a number of critically arranged elements, those skilled in the art will recognize the true scope of the invention as defined in the claims that follow.

The invention claimed is:

1. An improved monoblock laser cavity comprising:
a laser source material;
a Q-switch; and
an OPO crystal;
wherein the positioning of the Q-switch and the OPO crystal establish an OPO cavity and are manipulated to decrease a beam divergence of a laser pulse and
wherein the Q-switch has antireflective coatings on an input and output end of the Q-switch and a highly reflective coating is applied before the antireflective coating on the output end of the Q-switch and the OPO crystal is coated on an input end with two antireflective coatings.

2. The improved monoblock laser cavity of claim 1 wherein the OPO cavity is 2 to 3 times a length of the OPO crystal.

3. The improved monoblock laser cavity of claim 1 the Q-switch has antireflective coatings of 1 um on an input and output end of the Q-switch and a highly reflective coating of 1.5 um is applied before the antireflective coating on the output end of the Q-switch and the OPO crystal is coated on an input end with two antireflective coatings, a first coating being 1.5 um and a second coating being 1 um.

4. A method of making an improved momoblock laser cavity comprising the steps of:
providing a laser source material;
providing a Q-switch; and
providing an OPO crystal; and
positioning of the Q-switch and the OPO crystal so as to establish an OPO cavity; and
manipulating the length of the OPO cavity to decrease a beam divergence of a laser pulse and
wherein the Q-switch has antireflective coatings on an output end of the Q-switch and a highly reflective coating is applied before the antireflective coating on the output end of the Q-switch and the OPO crystal is coated on an input end with two antireflective coatings.

5. The method of claim 4 wherein the OPO cavity is 2 to 3 times a length of the OPO crystal.

6. The method of claim 4 wherein the Q-switch has antireflective coatings of 1 um on an input and output end of the Q-switch and a highly reflective coating of 1.5 um is applied before the antireflective coating on the output end of the Q-switch and the OPO crystal is coated on an input end with two antireflective coatings, a first coating being 1.5 um and a second coating being 1 um.

* * * * *